United States Patent

Servadio

[15] 3,700,281

[45] Oct. 24, 1972

[54] AUTOMATIC SAFETY SEAT CLAMP

[72] Inventor: Robert Servadio, 3721 Parkview Avenue, Pittsburgh, Pa.

[22] Filed: March 8, 1971

[21] Appl. No.: 121,804

Related U.S. Application Data

[63] Continuation-in-part of Ser. No. 804,423, March 5, 1969.

[52] U.S. Cl. .............................. 297/390, 280/150 SB
[51] Int. Cl. ............................................ A62b 35/60
[58] Field of Search..297/384, 390, 389; 280/150 SB

[56] References Cited

UNITED STATES PATENTS

| | | | |
|---|---|---|---|
| 3,414,326 | 12/1968 | Raffaelli | 297/389 X |
| 3,409,326 | 11/1968 | Kerner | 297/384 |
| 3,262,716 | 7/1966 | Graham | 297/390 X |
| 3,343,623 | 9/1967 | Porter | 297/385 |
| 2,873,122 | 2/1959 | Peras | 297/384 X |
| 3,203,733 | 8/1965 | Priest et al. | 297/389 |
| 3,466,091 | 9/1969 | De Grusso | 297/390 |

*Primary Examiner*—James T. McCall
*Attorney*—William J. Ruano

[57] ABSTRACT

An automatic safety seat pair of clamps adapted to be moved in front of an occupant of a vehicle seat, one to restrain his mid section and the other, his shoulders, and thus prevent him from being thrown forwardly during an accident. The mid-section safety clamp is automatically raised from a low retracted position and the shoulder clamp is moved inwardly in front of the shoulders in response to the occupant's body pressure which actuates a switch on the seat back. The mid-section clamp completely encircles the occupant in response to foot pedal action. The clamps are retracted by motor power.

8 Claims, 11 Drawing Figures

INVENTOR.
ROBERT SERVADIO
BY *William J. Ruano*
ATTORNEY

INVENTOR.
ROBERT SERVADIO
BY
ATTORNEY

3,700,281

AUTOMATIC SAFETY SEAT CLAMP

This is a continuation-in-part of my U.S. Pat. application, Ser. No. 804,423, filed Mar. 5, 1969.

This invention pertains to an automatic safety seat clamp that has, in addition to the earlier automatic restraining elements for the mid-section of the occupant's body, a shoulder restraining means which can more effectively prevent an occupant of a vehicle seat from being thrown forwardly, during an accident, against rigid portions of the vehicle.

The safety seat clamp is especially suitable for providing protection to an operator of a delivery truck who must make frequent stops to make deliveries and for pick-ups of mail, milk and the like.

An occupant, such as an operator of a truck that makes frequent stops, tends to refrain from using conventional safety belts because it would take considerable time and effort to couple and uncouple a safety belt many times a day. Even the ordinary driver or passenger refrains from using conventional safety belts and the like because of the necessity of using the hands to adjust and apply them.

An object of the present invention is to provide a novel vehicle occupant restraining device that is operable automatically by the mere seating movement of the occupant without the necessity of using his hands.

Another object of the present invention is to provide novel automatic clamp means responsive to seating movement by the occupant to apply a restrainer about his midsection and shoulders driven by operation oa a releasing mechanism by the operator.

A more specific object of the invention is to provide an automatic, reversible motor driven means for moving restrainer clamps vertically upwardly in response to his leaning against the back of his seat and which is quickly releasable in response to his operation of a mechanical unlatching means, whereby such operation may be performed very rapidly without the use of the occupant's hands.

Other objects and advantages will become more apparent from a study of the following description, taken with the accompanying drawings wherein:

Figure 1:
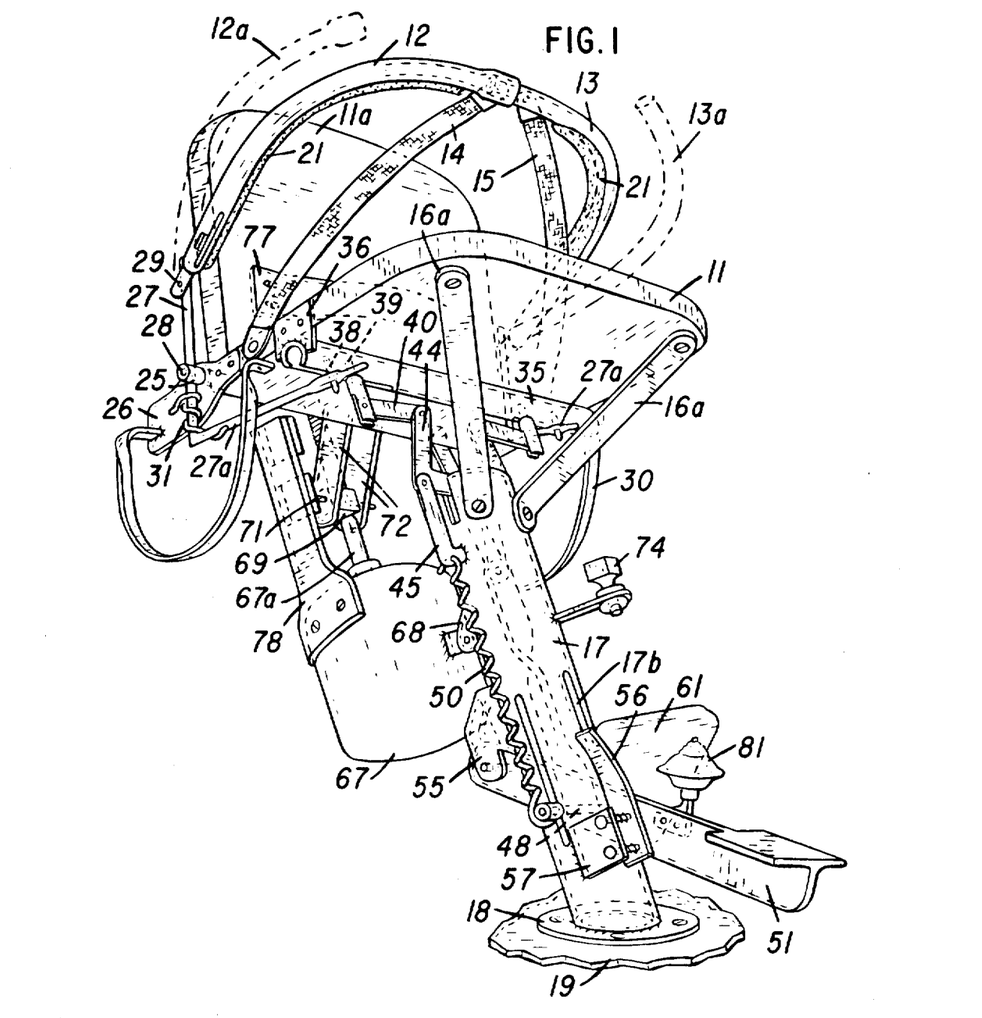
FIG. 1 is a perspective elevational view showing the front and a side of a vehicle seat having an automatic safety seat clamp embodying the present invention.
Figure 2:
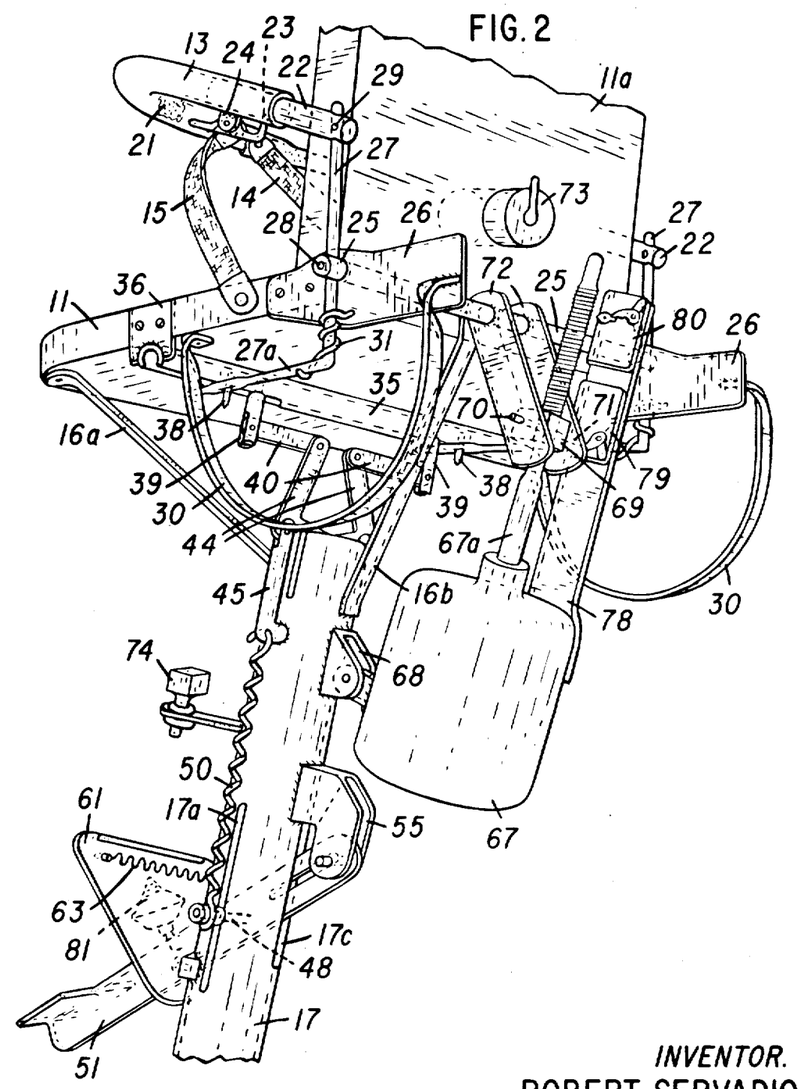
FIG. 2 is a perspective elevational view showing the rear and the other side of the seat.

Referring more particularly to the drawings, FIGS. 1 and 2 show a vehicle seat 11 along with restrainer clamp arms 12 and 13, and restrainer seat belts 14 and 15. The restrainers are positioned so as to restrain an occupant of the seat 11 from being thrown forward or aside by momentum forces during a collision.

The occupant may be an operator or a passenger of a vehicle. For purposes of illustration, the seat 11 shown is similar to the seat for an operator of a delivery truck of the walk-in type such as a milk or U.S. mail truck.

Figure 3:
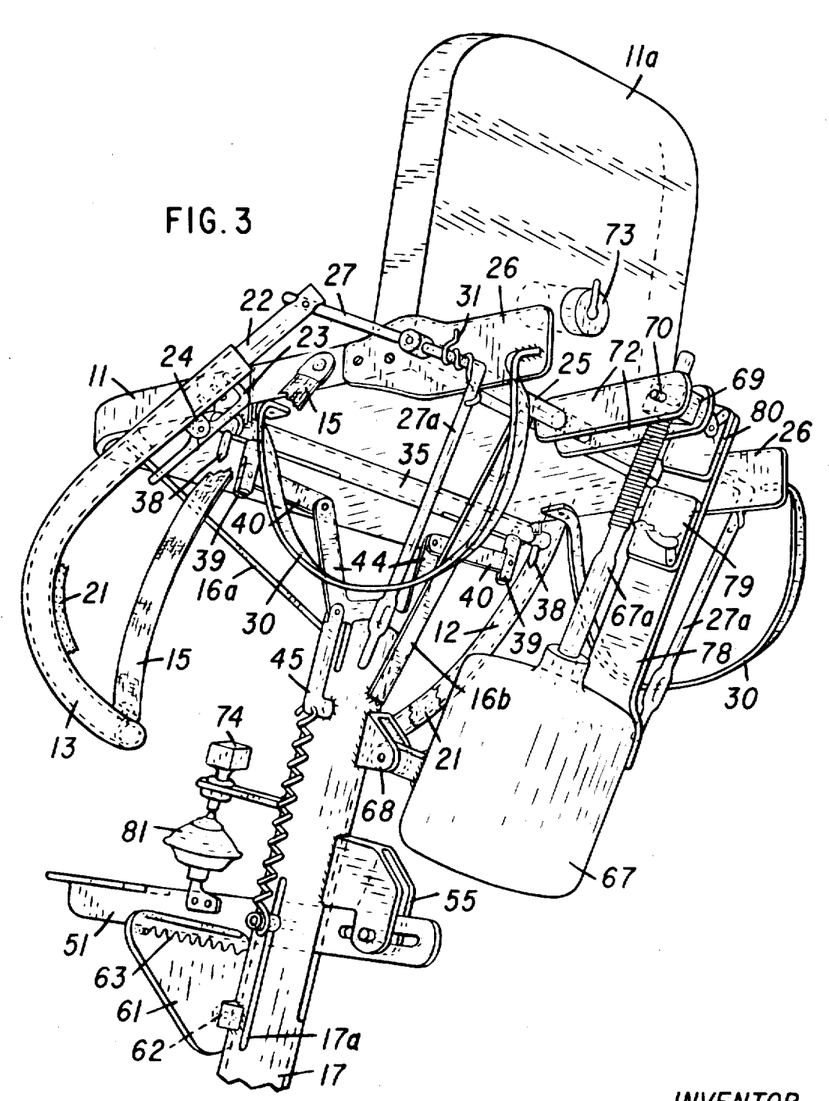
FIG 3 is a view similar to FIG. 2 but showing protective elements in retracted positions.

FIG. 3 shows the restrainers in fully retracted positions. Phantom outlined positions 12a and 13a shown in FIG. 1, indicate lateral retracted positions of the arms 12 and 13. The arms 12 and 13 are preferably made of rigid tubular construction. The belts 14 and 15 may be made of nylon fabric.

The rear ends of belts 14 and 15 are fastened to the seat 11. The forward end of belt 14 is fastened to the arm 12. THe forward end of belt 15 is fastened to the arm 13.

The seat 11 has a back portion 11a. The seat 11 is mounted on bars 16a and 16b. A strong tube 17 supports the bars 16a and 16b (FIG. 1). A flange 18 is welded to the bottom of the tube 17. The flange 18 is fastened to the vehicle's floor structure 19. Soft cushioning or padding 21 may be fastened to the surfaces of the arms 12 and 13 that confront the occupant of the seat 11. The seat 11 is shown as being made of wood, but it may be made of metal or plastic. A cushion (not shown) may be mounted on the seat 11.

Arms 12 and 13 may be made wholly of strong metal tubing such as aluminum, steel or alloys thereof. The arms may be made more useful by using a solid rod 22 (FIG. 2) to connect each tube to a shaft 27, as shown in detail in FIG. 3. Each tube is connected to a rod 22 with a pin 23 (FIG. 2). Each pin 23 may be mounted on a tube with a clevis 24 that has a spring to force the pin 23 into engagement with the rod 22. The rod 22 may have a series of holes to which the pin 23 may be selectively engaged to allow the arms to be adjusted outwardly. The pin 23 has a handle that can be pressured to retract the pin from the rod 22. THe pin 23 can be retracted to allow quick emergency removal of the arm when the mechanism for retracting the arms is deformed during a collision, thereby preventing the occupant from being trapped.

A horizontal shaft 25 is mounted on the rear of the seat 11 with a pair of plates 26 to serve also as a seat hinge. Each end of the shaft 25 has a transverse hole to which an L-shaped shaft 27 is pivotally engaged. A key 28 at the end of shaft 25 has a non-threaded end that projects loosely into a key-way like groove that encircles a shaft 27, thereby allowing the shafts 27 to pivot while maintaining their relative positions with the shaft 25.

Arms 12 and 13 are keyed to slightly flattened portions of the shafts 27 with set-screws 29 or the like, the set-screws 29 allow the arms 12 and 13 to be adjusted vertically. The arms 12 and 13 may be adjustably positioned so their rear ends are as low as possible so as to be comfortable to the driver or occupant.

The arms 12 and 13 may be positioned high as shown in FIG. 1, so as to confront the mid-section at the occupant's chest, thereby restraining the upper portion of the occupant's torso from pivoting downwardly during a rapid deceleration caused by a collision accident.

When the arms 12 and 13 are positioned high to confront the chest, the belts 14 and 15 can restrain the lower portion of the torso from objectionably moving forward on the seat 11. When the arms 12 and 13 are positioned high, as shown in FIG. 1, the upper portions of the shafts 27 can bend slightly to cushion the occupant when he is forced against the arms. Spring steel may be used so that any give would not result in a permanent bend.

The clamp arms 12 and 13 may be adjusted so that occupant's body bears almost wholly against belts 14 and 15, whereby the arms 12 and 13 act as positioners to position the belts in protective positions.

A pair of U-shaped limit bars 30 are fastened to the seat 11 and to plates 26. Each shaft 27 holds a coiled spring 31 (FIG. 1), that tends to force the shaft to pivot so the shafts lower portion 27a pivots outwardly and bears against the inner edge of the adjacent bar 30. Springs 31 are motors that help to force the arms 12 and 13 into lateral retracted positions when the arms are free to move laterally. The shafts 27 are forced to pivot laterally about their axes to couple the arm 12 to the arm 13 and they are forced to pivot oppositely to retract the arms to the positions 12a and 13a.

Figures 4, 6:
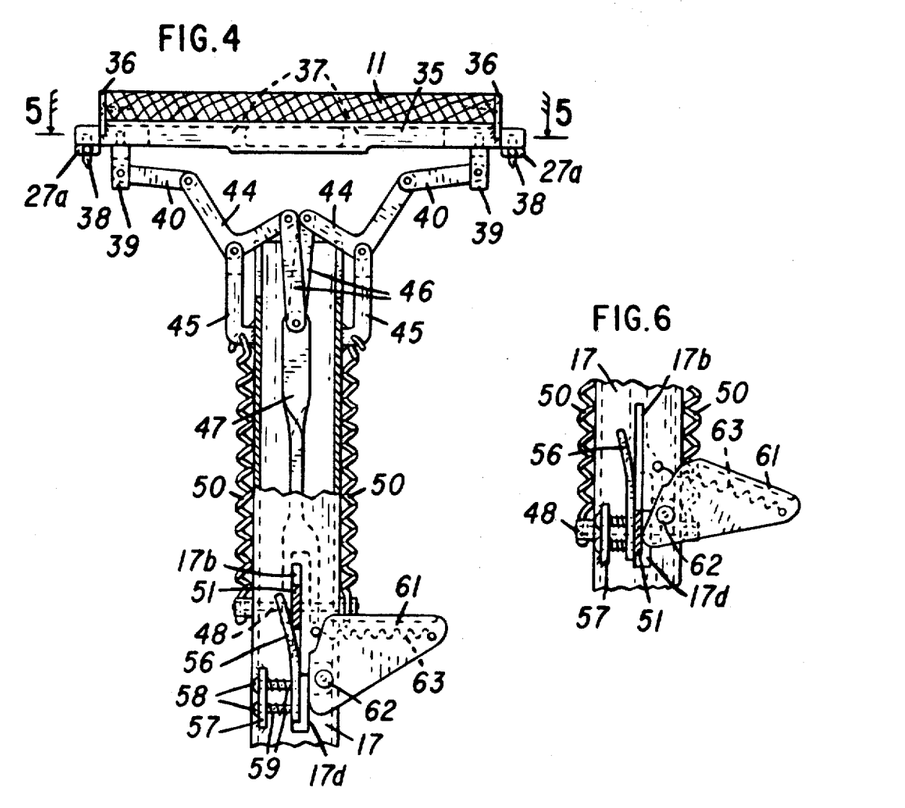
FIG. 4 is a fragmentary elevational sectional view showing details of the mechanism for closing and opening restrainers.
FIG. 6 is a fragmentary elevational view similar to a portion of FIG. 4, but showing parts in different positions.
Figure 5:
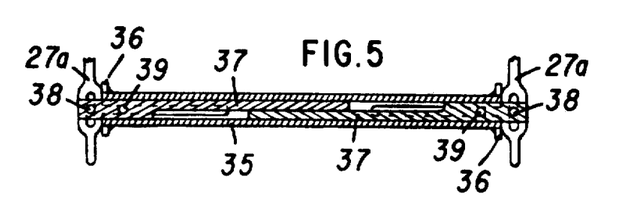
FIG. 5 is a sectional view taken along line 5—5 of FIG 4.

FIGS. 4 and 5 show the details of the mechanism that causes the shafts 27 to pivot laterally. A strong tube 35 (FIG. 2) is welded to a pair of plates 36 (FIG. 2). The plates 36 are fastened to the seat 11. A pair of round shafts 37 has a half-round portion to allow the shafts to slidably engage each other. Each shaft 37 holds a pin 38 (FIG. 4) which is press-fitted or threaded to it. The end portions of the tube 35 are slotted to allow pins in the shafts 37 to move laterally.

Each pin 38 is engageable with a slot in a shaft lower portion 27a (FIG 4). A slotted fastener 39 (FIG. 4) is press-fitted or threaded to each shaft 37. A pair of links 40 are pivotally connected to the fasteners 39 and to a pair of bellcranks 44. The bellcranks 44 are pivotally mounted on a pair of fasteners 45. The fasteners 45 are welded to the tube 17. A pair of links 46 are pivotally connected to the bellcranks 44 and to a main link 47. The link 47 has a clevis shaped lower portion that engages a slidable pin 48. The pin 48 slidably engages a pair of slots 17a (FIG. 2) in the tube 17. A pin 48 has a head and a nut, each of which has a groove to anchor a lower end of one of two springs 50. The upper ends of the springs 50 are hooked into the fasteners 45. The springs 50 are the motors that supply the major forces that retract the arms 12 and 13 when the arms are free to move laterally.

A rocker control pedal bar 51 is pivotally engaged with the pin 48 (FIGS 1 and 1). The pedal 51 is pivotally and slidably engaged with a clevis 55. The clevis 55 is welded to the tube 17. The pedal 51 slidably engages slots 17b and 17c in the tube 17.

The occupant depresses the front portion of the pedal 51 to cause the arms 12 and 13 to close so they engage each other with plug and socket type engagement. When the pedal 51 is depressed, it engages a notch 17d (FIG. 4) in the tube 17, to prevent the pedal from rising after the occupant removes his foot from the pedal. A curved bar 56 (FIG. 1) forces the front of the pedal 51 aside into the notch 17d. The bar 56 is slidably mounted on a plate 57. THe plate 57 is welded to the tube 17. A pair of pins 58 slidably engage the plate 57 and threadably engage the bar 56. A pair of springs 59 pressure the bar 56.

A release control pedal 61 is pivotally mounted on the tube 17 with a pin 62. The pedal 61 is depressed by the occupant's foot to the position shown in FIG. 6, to cause it to push the pedal bar 51 out of the notch 17d, to enable the springs 50 to raise the pin 48 and the linkage connected to it, so as to spread the arms 12 and 13. A return spring 63 forces the pedal 61 to return after the occupant releases the pressure on the pedal.

The depressing of the pedal 61 also causes the arms 12 and 13 to pivot downwardly from the raised positions shown in FIGS. 1 and 2 to the lowered positions shown in FIG. 3, as will be described in detail hereinafter.

An electrical wiring plug 66 is interconnected to the vehicle's electrical power source. A reversible motor 67 is pivotally mounted to a clevis 68 (FIG. 2). The clevis 68 is welded to the tube 17. The motor 67 has a long threaded shaft 67a that engages a threaded block 69. The block 69 has pins 70 and 71 pressed into it. The pins 70 and 71 pivotally engage a pair of bars 72. The bars 72 are welded to the shaft 25 (FIG. 3). The motor 67 raises and lowers the arms 12 and 13 in response to switches 73 and 74.

Figure 7:
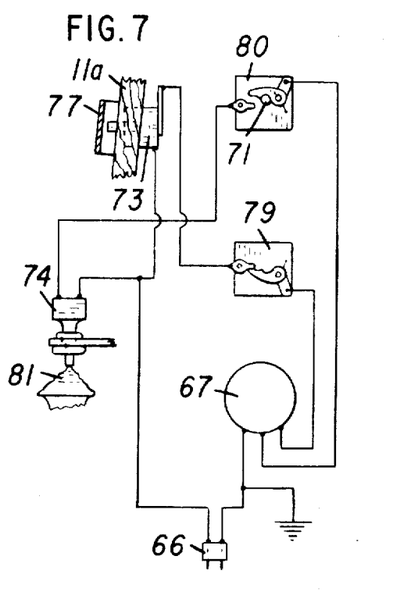
FIG. 7 is a schematic diagram showing the electrical circuit for the safety seat clamp.

When the occupant positions himself in the seat 11, his back depresses a thin horizontally bowed band 77 (FIG. 1) that is mounted with screws onto the seat back 11a. The band 77 has slotted holes to allow at least one end to slide and to allow the band to flatten to an extend from the pressure of the occupant's back against it. WHen the band 77 flattens to a predetermined extend, it depresses an actuating member of a switch 73, (see FIG. 7). The switch 73 closes an electrical circuit that activates the motor 67 causing the motor shaft 67a to rotate and force the block 69 downwardly from the position shown in FIG. 3 to the position shown in FIG. 2, thereby causing the shaft 25 to pivot and raise the arms 12 and 13.

A circuit breaker support 78 (FIG. 1) is mounted on the motor 67. A lower circuit breaker 79 and an upper circuit breaker 80 (FIG. 2) are mounted on the support 78.

When the motor 67 causes the threaded block 69 (FIG. 2) to move downwardly close to its lower position, the pin 71 engages and opens the lower circuit breaker 79, causing the motor 67 to stop.

The pedal 51 has a delayed action dash-pot depressor 81 (FIG. 1) attached to it. When the occupant depresses the release pedal 61 and causes the front portion of the pedal 51 to pivot upwardly, the dash-pot depressor 81 is forced against a plunger of a switch 74. The switch 74 is mounted on the tube 17. The dash-pot depressor 81 causes the plunger of the switch 74 to close a circuit in the switch, thereby activating the motor 67 causing the shaft 67a to rotate in an opposite direction, causing the block 69 to rise, and the arms 12 and 13 to move downwardly. When the pin 71 (FIGS. 2 and 7) reaches the upper circuit breaker 80, it breaks the circuit causing the motor 67 to stop. After the motor 67 has stopped, the upper end of the depressor 81 shrinks downwardly as air bleeding action takes place, thus opening the circuit of switch 74.

The circuit breakers 79 and 80 are adjustably positioned on the support 78 to suit the preferred limits of the vertical movements of arms 12 and 13.

All the above action takes places without the operator ever having to use his hands, which is the basic idea for the present safety seat clamp. Such action can take place while the vehicle is moving or is stopped, depending upon the operators desires, therefore it saves considerable time of the operator.

When the arms 12 and 13 are in the raised by laterally retracted positions 11a and 11b, they would tend to obstruct the movement of the occupant's arms. Thus the occupant will depress the pedal 51 to cause the arms 12 and 13 to pivot close to his body where they would not hinder his arm movements.

Figure 8:
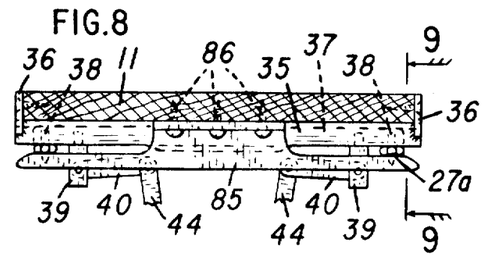
FIG. 8 is an elevational view showing a security lock bar for use with the mechanism shown in FIGS. 1, 2 and 3.
Figure 9:
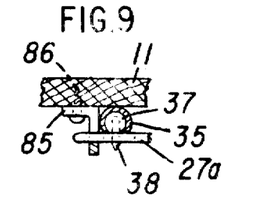
FIG. 9 is a fragmentary sectional view taken along line 9—9 of FIG. 8.

FIGS. 8 and 9 show a modification having a security lock bar 85, positioned in front of the tube 35, on the bottom of the seat 11. The bar 85 is an angle shape, that is fastened to the seat 11 with screws 86. The bar 85 may be welded to the tube 35 to make its mounting to the seat stronger. Each end of the bar 85 is recessed to the shaft portions 27a are securely locked against any unintential release, such as by road shock from pot holes, while in protective position around the driver or passenger or while the arms are being pivoted laterally into protective positions. The bar 85 allows the power transmitting parts connecting the motor 67 and the shafts 27 to be just strong enough to raise and lower the arms 12 and 13 since the thrust of the occupant against the arms 12 and 13 would be diverted against the bar 85.

As a modification of the invention, the electric motor, when actuated by the switch located on the seat, may cause the restraining means to not only pivot upwardly from the retracted position below the seat, but it could also cause the restrainer means to completely encircle, rather than partially encircle, the occupant. Conversely, to free the occupant, operation of the pedal could not only cause lateral retraction, but downward retraction as well to the position below the seat in response to operation of the electric motor. In short, each of the entire operations of clamping the restraining means and unclamping it may be electric motor operated if so desired.

In my earlier filed patent application, I described an automatic, seat belt operating device actuated by a driving motor driving a threaded drive shaft propelling a carriage in opposite directions to effect raising and lowering movements as well as opening and closing movements of a pair of arms adapted to encircle the stomach portion of the body for restraining the driver or occupant of a vehicle.

Figures 10, 11:
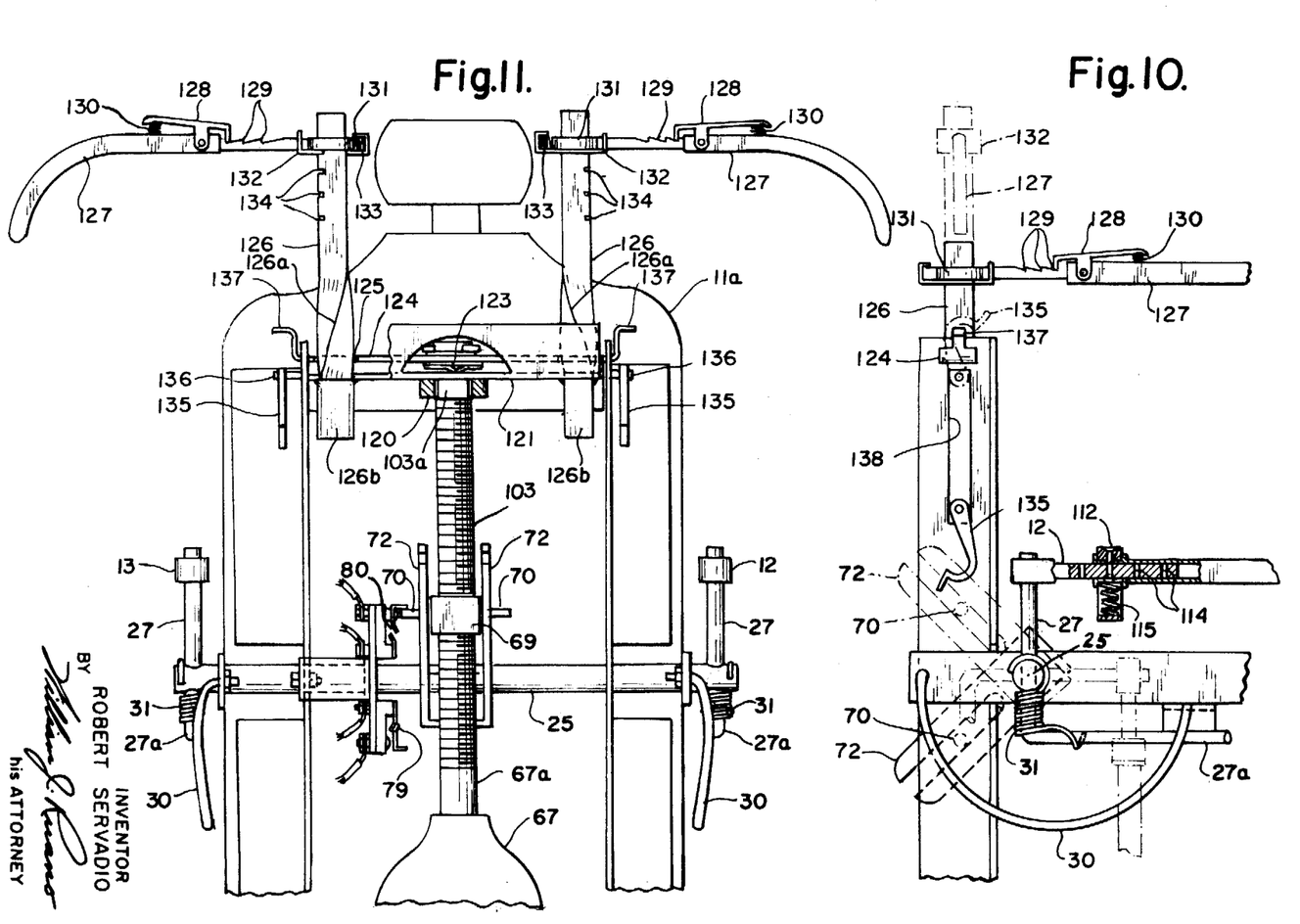
FIGS. 10 and 11 are partial side and rear views of a shoulder-restraining means embodying the present invention and improvement.

By the present invention, an improvement has been added whereby the same threaded drive shaft will also actuate shoulder restraining bars by moving them from a position behind and paralleling the occupant's seat to a position substantially at right angles thereto forwardly of the seat to encircle the shoulders of the occupant whereby the occupant is further restrained from being thrown forwardly in the event of a sudden stoppage of the vehicle, as shown in FIGS. 10, 11.

More specifically, as described above and in my earlier application, on the back of seat 11a there is mounted a frame supporting a driving motor 67 which drives a threaded drive shaft or screw 67a which effects reciprocating movements of a carriage 69 having integral extensions 70 which fit through central longitudinal slots in pivotal arms 72. These arms are integrally secured at one end to shaft 25 so that when carriage 69 is propelled downwardly, it will turn shaft 25 about its axis, as shown in dash lines in FIG. 10, and in so doing will tilt the supporting arms 27 rigidly secured to the body restraining arms 12, 13 from a downwardly and forwardly pointed position to the position shown ( operating control switch 79,80 during such movement) wherein the restraining arms 12, 13 encircle the body or mid-section ( or chest) of the wearer forwardly in the plane parallel to the seat. Arms 12, 13 are adjustable by selectively inserting pin 112, biased downwardly by spring 115, into any of the holes 114 so as to accomodate the waist size of the occupant. This construction is illustrated and described in FIGS. 1–9 of my earlier filed application. Springs 31 bias arms 27a, integral with arms 27, against guide bars 30 so as to guide movements of restraining arms 12, 13.

In accordance with the present invention, the same threaded drive shaft 67a is used also to actuate a pair of curved, shoulder restraining elements 127, which are shown in the inactive position, that is, extending outwardly in a plane immediately behind seat 1. Elements 127 are mounted on vertically extending rods 126 of square ( or other) cross-section but having a twisted lower portion 126a forming a very gradually pitched screw threaded member having lower cylindrical sleeve portions closely fitting in cup-shaped elements 126b rigidly mounted on carriage or sled bar 121 so that reciprocation of the sled bar or carriage 121 will move elements 126b and cause turning about their axes of the square rods 126, since their lower ends are attached to the bottoms of elements 126b in a manner to permit rotation of rods 126, so as to progressively move shoulder restraining arms 127 from the position shown to a position at right angles thereto forwardly of the seat so as to partially encircle the shoulders of the occupant.

More specifically, as the sled bar 121 moves downwardly it will also move downwardly, with it, integrally connected cup-shaped elements 126b. However, since stationary plate 124 has a square hole 125 which closely fits the square outline of rod 126, it will effect axial turning movement of rods 126 from the inoperative position of the restraining elements 127, as shown, to their position forwardly of the seat encircling the shoulders of the seat occupant. When the screw threaded member 103 is turned in an opposite direction, it will move shoulder restraining arms 127 from the forward or operative position to the inoperative position shown in FIG. 11.

The shoulder restraining arms 127 are adjustable in length by any suitable adjusting means, such as ratchets 129 which are selectively engaged by a pivotal detent 128 biased by spring 130 to the engaged position. The shoulder restraining elements 127 are also adjustable in a vertical direction by providing a thick washer-like element 131 with a square hole closely fitting about the square rod 126 and being vertically slidable thereon but held in any selected position in which detent 132, biased by spring 133, is selectively fitted into any of the slots 134 to suit the height of the occupant.

In some instances, the occupant may wish to operate only the restraining elements 12, 13 and to make the shoulder restraining elements 127 inoperative. All that is necessary to put the shoulder restraining elements out of operation is to put hooks 135, pivotally mounted on bar 121 over the latch elements 137 rigidly mounted on stationary plate 124, as shown in dash and dot outline in FIG. 10, so as to make it impossible for bar 121 to be reciprocated and for rods 126 to turn about their axes. This is made possible by not threading the top portion of shaft 103 so that when sled 121 is in the position shown in FIG. 1, no reciprocation of the sled 121 is effected by rotation of shaft 103. Then when it is desired to put the shoulder restraining elements in operation again, hooks 135 are unhooked from latch elements 137.

From the above, it will be seen that I have provided a pair of shoulder restraining elements 127 which can be brought to the operative or closed position simultaneously with movements of the waist line or chest restraining elements 12, 13 and which may be brought to the open position simultaneously with movements of elements 12, 13 to the open position.

Thus it will be seen that I have provided a highly efficient automatic device for quickly and easily attaching or applying and retracting restraining elements which serve in the same manner as safety seat belts in automotive vehicles and the like; furthermore, I have provided a motor driven mechanism for accomplishing the application and retracting of said restraining elements in a quick and secure manner without the necessity of the use of the operator's hands but by the mere seating of the occupant and his depression of a pedal, whereby use of the safety mechanism will be greatly encouraged even in cases of mail delivery men, milk men and the like who make very frequent stops, therefore who must apply and remove the restraining elements numerous times per hour.

While I have illustrated and described several embodiments of my invention, it will be understood that these are by way of illustration only and that various changes and modifications may be made within the scope of the following claims.

I claim:

1. In combination with a seat in a vehicle, a first pair of restrainer means for substantially encircling a midportion of the body and a second pair of restraining means for substantially encircling the shoulders of an occupant of said seat, said first and second pairs of restrainer means including stiff arm portions, support means mounted on rear portions of said seat for supporting said stiff arm portions, said support means including pivotal means to pivot said stiff arm portions of said first and second pairs of restrainer means substantially laterally of the seat, positioning means powered by motor operating means to hold said first and second pairs of stiff arm portions in protective positions substantially encircling the body and shoulders, respectively, of said occupant, and lateral retracting means for retracting said stiff arm portions to lateral retracted positions to allow the occupant to remove himself from said pairs of restrainer means.

2. The combination recited in claim 1 wherein said motor operated means is responsive to seating movement of the occupant for automatically moving said first and second pair of restraining means into said protective positions.

3. The combination recited in claim 1 together with a reversible electric motor mounted on the rear of said seat, a threaded driven shaft operated by said motor, control means responsive to seating movement of the occupant and operated by said threaded shaft to move said pairs of restrainer means into protective positions, and means operated by reverse movement of said motor for retracting said pairs of restrainer means.

4. The combination recited in claim 1 together with means for selectively adjusting the height of said second pair of restraining means.

5. The combination recited in claim 4 together with means for adjusting the height of said second pair of restraining means.

6. The combination recited in claim 1 wherein said second pair of restraining means includes a pair of vertically extending rods, a shoulder restraining arm extending at right angles to each of said rods, said arms being normally parallel to the back of said seat but movable from such position through an angle of about 90° to a forward, shoulder restraining position.

7. The combination recited in claim 6 together with means for adjusting the height on said rods and length of said shoulder restraining arms.

8. The combination recited in claim 6 together with operating means driven by a reversible motor for turning said rods about their longitudinal axes to selectively move them into protective and retracted positions as the result of operation of said motor in one direction or an opposite direction.

* * * * *